W. F. OBERHUBER.
BAND BRAKE.
APPLICATION FILED FEB. 24, 1911.
994,332.
Patented June 6, 1911.
2 SHEETS—SHEET 2.
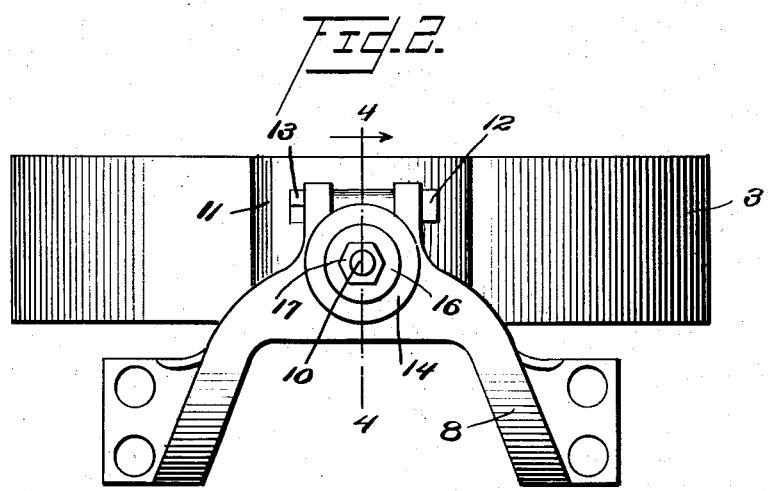
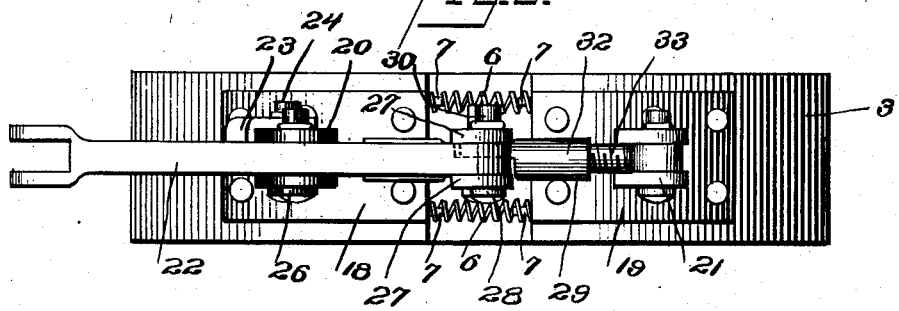
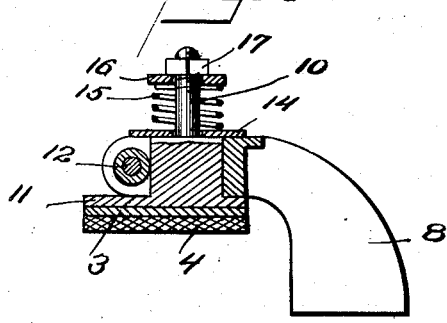
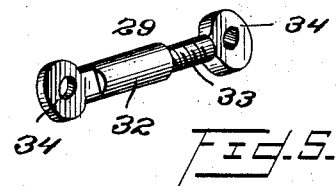
Witnesses
H. Strauss
R. N. Krenkel
Inventor
William F. Oberhuber
By Joshua R. H. Potts
Attorney

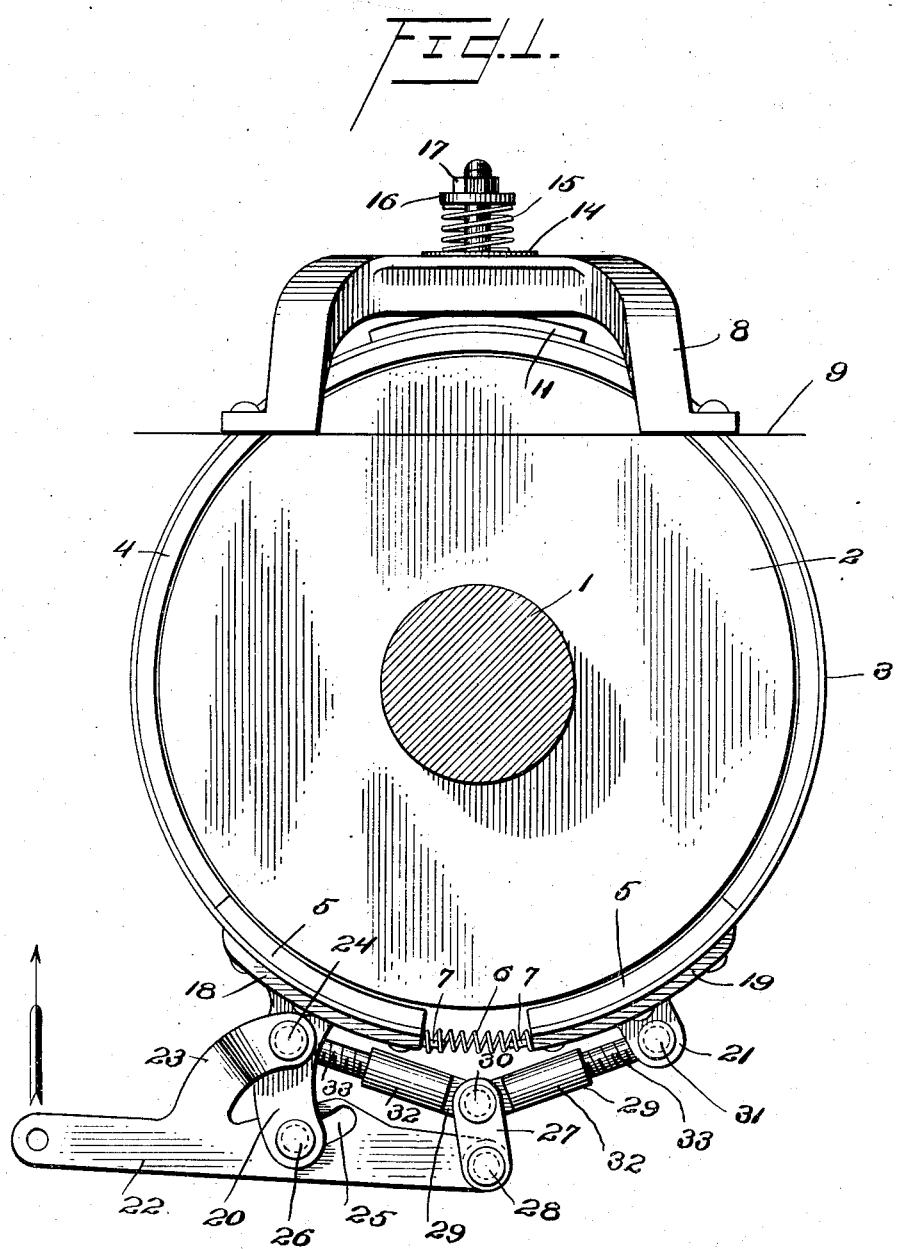

UNITED STATES PATENT OFFICE.

WILLIAM F. OBERHUBER, OF PHILADELPHIA, PENNSYLVANIA.

BAND-BRAKE.

994,332.

Specification of Letters Patent. Patented June 6, 1911.

Application filed February 24, 1911. Serial No. 610,597.

*To all whom it may concern:*

Be it known that I, WILLIAM F. OBERHUBER, a citizen of the United States, residing at Philadelphia, in the county of Philadelphia and State of Pennsylvania, have invented certain new and useful Improvements in Band-Brakes, of which the following is a specification.

My invention relates to improvements in band brakes, the object of the invention being to provide improved means for compelling the band to grip uniformly at all points, and provide improved operating means for drawing the ends of the band toward each other.

A further object is to provide improved band brake operating means, which may be adjusted as the face of the brake wears, and which operating means is extremely sensitive and responds quickly and with great leverage to the operation of the controlling means.

With these and other objects in view, the invention consists in certain novel features of construction and combinations and arrangements of parts, as will be more fully hereinafter described and pointed out in the claims.

In the accompanying drawings: Figure 1, is a view in elevation of my improvements showing them in position on a wheel hub. Fig. 2, is a top plan view. Fig. 3, is a bottom plan view. Fig. 4, is a view in section on the line 4—4 of Fig. 2, and Fig. 5, is a detail perspective view of one of the adjustable rods 29.

1, represents a wheel axle, and 2 a wheel hub thereon. My improved brake comprises a split band 3 positioned around the hub and having on its inner face a friction engaging material 4. I preferably employ as a friction engaging material, what is known in the trade as "rhabestos", and adjacent the ends of the band brass plates 5, but I of course, am not limited to any particular friction material.

The band is normally held open by means of coiled springs 6 bearing against the ends of the band, and supported on lugs 7. To further hold the band off of the hub, various means may be provided. I have shown for this purpose a bracket 8, which is fixed to any suitable support 9, and extends over the upper portion of the band, where it is bifurcated to receive a post 10 fixed to a plate 11, the latter secured to the top of the band 3. This post is held against escape from the bracket by means of a bolt 12 and nut 13 in the bifurcated portion of the bracket, and projects through a disk 14 on top of the bracket. A coiled spring 15 is positioned around the post and bears at one end against this disk 14, and at its upper end against a washer 16, which is held in position on the post by means of a nut 17 screwed onto the upper end of the post. The spring 15 exerts a lifting action on the band 3, so that when the springs 6 force the band apart, spring 15 elevates the band, so that it is freed from the hub at all points.

To contract the band, on the hub, my improved mechanism is provided, and will now be described in detail.

Plates 18 and 19 are secured to the outer face of band 3 at its respective ends. Plate 18 is made with a relatively long curved bifurcated lug 20, while plate 19 is made with a relatively short bifurcated lug 21.

22, represents a lever which is made with an off-set arm 23, pivotally supported on a pin 24, projecting through the lug 20 near the inner end of the latter. The main portion of this lever 22 is located in the bifurcated lug 20, and is provided with a curved slot 25 through which a pin 26 in the outer end of the lug 20 projects. To the opposite sides of lever 22, at one end, links 27 are pivotally connected by a pin 28 and the opposite ends of these links 27 are positioned at opposite sides of adjustable connecting rods 29, and are pivotally connected to said rods by means of pin 30. One adjustable connecting rod 29 is connected to the lug 20 by pin 24, while the other rod 29 is connected by a pin 31 with lug 21.

While I refer to the pivotal connecting devices 24, 26, 28, 30, and 31 as pins, they may of course, be other suitable devices for the purpose, and may be secured in various ways, a simple securing means being illustrated, namely, the employment of cotter pins which engage through one end of the several pivot pins, while the other end of the several pivot pins are enlarged forming heads.

Each adjustable connecting rod 29 comprises two members 32 and 33. Member 32 is tubular in form, and internally screw-threaded to receive member 33, which is externally screw-threaded. Both members are provided with flattened perforated ears 34 at their outer ends, and the length of the rod may be adjusted by turning the members in opposite directions. This adjustment is very essential as it enables the brake to be adjusted as the contacting material in the band becomes worn, and also to permit a nice adjustment of the parts in assembling.

The operation is as follows: Referring particularly to Fig. 1, it will be noted that the brake is in its released position. When the lever 22 is moved in the direction of the arrow, links 27 are drawn downwardly and also to the left. By reason of the pivotal connection between the off-set arm 23 and pin 24 with lug 22, this movement to the left or in the arc of a circle is limited by the slot 25, when the action of the toggle lever formation consisting of levers 27 and rods 29 compel the band to tightly engage hub 2. When the lever 22 is released, springs 6 and 15 quickly return the band to its releasing position.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A band brake comprising a band, lugs on the band near its ends, a lever, an arm on said lever pivoted to one of said lugs, rods pivotally connected to said lugs, and links pivotally connecting said rods to one end of said lever, substantially as described.

2. A band brake comprising a band, lugs on the band near its ends, a lever, an arm on said lever pivoted to one of said lugs, rods pivotally connected to said lugs, links pivotally connecting said rods to one end of said lever, and springs interposed between the ends of said band and tending to expand said band, substantially as described.

3. A band brake comprising a band, springs tending to expand the band, lugs secured to said band near its ends, one of said lugs longer than the other, a lever having a slot therein between its ends, a pin in the outer end of the longer lug projected through said slot, an arm on said lever pivotally connected to said longer lug near the inner end of the latter, and means connecting one end of said lever with both of said lugs, substantially as described.

4. A band brake comprising a band, springs tending to expand the band, lugs secured to said band near its ends, one of said lugs longer than the other, a lever having a slot therein between its ends, a pin in the outer end of the longer lug projected through said slot, an arm on said lever pivotally connected to said longer lug near the inner end of the latter, links pivotally connected to one end of said lever, and rods connecting said links with said lugs, substantially as described.

5. A band brake comprising a band, lugs on the band near its ends, a lever, an arm on said lever pivoted to one of said lugs, rods pivotally connected to said lugs, links pivotally connecting said rods to one end of said lever, a support, a bracket fixed to said support and overhanging said band, a post fixed to said band and projecting through the bracket, and a coiled spring above said bracket exerting upward pressure on said post, substantially as described.

6. A band brake comprising a band, springs tending to expand the band, lugs secured to said band near its ends, one of said lugs longer than the other, a lever having a slot therein between its ends, a pin in the outer end of the longer lug projected through said slot, an arm on said lever pivotally connected to said longer lug near the inner end of the latter, means connecting one end of said lever with both of said lugs, a support, a bracket fixed to said support and overhanging said band, a post fixed to said band and projecting through the bracket, and a coiled spring above said bracket exerting upward pressure on said post, substantially as described.

7. A band brake comprising a band, springs tending to expand the band, lugs secured to said band near its ends, one of said lugs longer than the other, a lever having a slot therein between its ends, a pin in the outer end of the longer lug projected through said slot, an arm on said lever pivotally connected to said longer lug near the inner end of the latter, links pivotally connected to one end of said lever, rods connecting said links with said lugs, a support, a bracket fixed to said support and overhanging said band, a post fixed to said band and projecting through the bracket, and a coiled spring above said bracket exerting upward pressure on said post, substantially as described.

In testimony whereof I have signed my name to this specification in the presence of two subscribing witnesses.

WILLIAM F. OBERHUBER.

Witnesses:
R. H. KRENKEL,
CHARLES E. POTTS.